(12) United States Patent
Ewers et al.

(10) Patent No.: US 9,777,867 B2
(45) Date of Patent: Oct. 3, 2017

(54) VALVE ARRANGEMENT

(71) Applicant: Öhlins Racing AB, Uplands Väsby (SE)

(72) Inventors: Benny Ewers, Vetlanda (SE); Simon Ivarsson, Jönköping (SE); Fredrik Larsson, Jönköping (SE)

(73) Assignee: OHLINS RACING AB, Upplands Väsby (SE)

( * ) Notice: Subject to any disclaimer, the term of this patent is extended or adjusted under 35 U.S.C. 154(b) by 175 days.

(21) Appl. No.: 14/784,218

(22) PCT Filed: Apr. 15, 2014

(86) PCT No.: PCT/EP2014/057576
§ 371 (c)(1),
(2) Date: Oct. 13, 2015

(87) PCT Pub. No.: WO2014/170303
PCT Pub. Date: Oct. 23, 2014

(65) Prior Publication Data
US 2016/0069471 A1   Mar. 10, 2016

(30) Foreign Application Priority Data

Apr. 16, 2013   (EP) ..................................... 13163976

(51) Int. Cl.
  *F16K 31/122*   (2006.01)
  *F16K 1/00*   (2006.01)
  *F16F 9/46*   (2006.01)
(52) U.S. Cl.
  CPC ............ *F16K 31/1221* (2013.01); *F16F 9/46* (2013.01); *F16F 9/465* (2013.01); *F16K 1/00* (2013.01)

(58) Field of Classification Search
  CPC .... F16K 31/1245; F16K 31/1221; F16K 1/14; F16K 1/526; F16F 9/50; F16F 9/465;
  (Continued)

(56) References Cited

U.S. PATENT DOCUMENTS 5,078,240 A * 1/1992 Ackermann ............ F16F 9/465
                                                   188/282.2
5,148,897 A * 9/1992 Vanroye ................. F16F 9/3482
                                                   188/282.6
(Continued)

FOREIGN PATENT DOCUMENTS

CN       101896732      11/2010
CN       101903678      12/2010
(Continued)

*Primary Examiner* — Mary McManmon
*Assistant Examiner* — Nicole Gardner
(74) *Attorney, Agent, or Firm* — Kagan Binder, PLLC

(57) ABSTRACT

A valve arrangement comprising a valve housing, a pilot chamber, a main valve member and a control valve member. The main valve member is axially movably arranged in the valve housing and is arranged to restrict a main fluid flow. The control valve member is movable in an axial direction relative the main valve member in response to an actuating force acting on the control valve member. The control valve member is arranged to interact with the main valve member to define axially separated pilot and bypass fluid restrictions. The pilot restriction restricts a pilot fluid flow out from the pilot chamber. The bypass restriction restricts a bypass flow bypassing the main fluid flow. The bypass flow is separate from the pilot fluid flow. The pilot and bypass restrictions are adjustable in response to the actuating force, thereby allowing simultaneous adjustment of the pilot pressure and the bypass fluid flow.

21 Claims, 9 Drawing Sheets

(58) Field of Classification Search
CPC ... F16F 9/34; B60G 2500/10; B60G 2500/11; B60G 2500/112; B60G 2500/114; B60G 2500/116; B60G 2202/41; B60G 2202/412; B60G 2202/413; B60G 2202/414; B60G 2202/415; B60G 2202/416
USPC .................................. 188/322.15, 322.13
See application file for complete search history.

(56) References Cited

U.S. PATENT DOCUMENTS

| | | | | |
|---|---|---|---|---|
| 5,409,088 | A * | 4/1995 | Sonsterod | F16F 9/3214 137/542 |
| 5,850,896 | A * | 12/1998 | Tanaka | F16F 9/516 188/266.2 |
| 5,934,421 | A | 8/1999 | Nakadate et al. | |
| 7,997,394 | B2 * | 8/2011 | Yamaguchi | F16F 9/465 188/266.2 |
| 8,798,859 | B2 * | 8/2014 | Uchino et al. | F16F 9/465 701/40 |
| 2010/0252766 | A1 * | 10/2010 | Forster | F16F 9/464 251/129.15 |

FOREIGN PATENT DOCUMENTS

| | | |
|---|---|---|
| CN | 102459943 | 5/2012 |
| DE | 4137403 A1 | 5/1993 |
| DE | 19652819 | 7/1997 |
| WO | 91/16556 A1 | 10/1991 |

* cited by examiner

VALVE ARRANGEMENT

CROSS-REFERENCE TO RELATED APPLICATIONS

This application claims priority to International Application No. PCT/EP2014/057576, filed Apr. 15, 2014, and titled "VALVE ARRANGEMENT", which in turn claims priority from European Application having Ser. No. 13/163,976.7, filed on Apr. 16, 2013, both of which are incorporated herein by reference in their entireties.

TECHNICAL FIELD OF THE INVENTION

The present invention generally relates to the field of valve arrangements. In particular, the present invention relates to a valve arrangement for controlling a flow of damping medium in a shock absorber.

TECHNICAL BACKGROUND

Generally, within the technical field of shock absorbers that include pilot valves, a pressure regulator, i.e. a valve arrangement, is used to control a flow of damping medium between a compression chamber and a rebound chamber during a reciprocal motion of a piston in a damping medium filled chamber of the shock absorber. The piston, via a piston rod, is connected either to a wheel or a chassis, whereas the chamber is connected to one of the wheel or chassis that the piston is not connected to. During a compression stroke the piston moves axially in a direction towards the compression chamber and thereby pressurizes the damping medium in the compression chamber. During a rebound stroke, the piston moves axially towards the rebound chamber, i.e. in the opposite direction, and thereby pressurizes the damping medium in the rebound chamber. In accordance with the function of the shock absorber, the pressurized damping medium needs to be transferred from the pressurized chamber to the other chamber, i.e. from the compression chamber to the rebound chamber or vice versa. The flow of damping medium needs to be controlled to obtain a damping effect of the piston and thus the shock absorber, i.e. to damp relative motion between the wheel and chassis.

The control of the pressure in the flow of damping medium in the shock absorber depends on the pressure created by the pilot valve. Pressure regulators in shock absorbers are usually provided with an axially movable or deflectable valve member, such as a washer, cone or shim that acts against a seat part. The pressure control is achieved by equilibrium or balance of forces, for example equilibrium between a pressure and/or flow force acting on the valve member in one direction and counteracting or opposing forces, such as one or more of a spring force, friction force or pilot pressure force acting on the valve member in the opposite direction. When the piston of the shock absorber moves at a certain speed such that the pressure and/or flow force become greater than the opposing or counteracting forces, the movable valve member is forced away from the seat part, thereby opening a flow passage. Thus, the movable valve member is forced to open at a stroke defined as a function of the flow produced by the pressure acting on the regulating area of the pressure regulator.

Traditional valve arrangements of the pressure regulating type described above generally have the disadvantage that the movable valve member opens abruptly when the piston of the shock absorber reaches a speed such that the pressure or flow forces become greater than the opposing forces. This may result in jerky or unsmooth damping performance, especially at low piston speeds.

In order to achieve smoother and more precise or accurate damping performance, especially at lower piston speeds, it is known to provide a bypass fluid flow passage bypassing the movable or deflectable valve member at low flows to achieve a less abrupt increase in damping effect with increasing piston or flow speed. One example of such an arrangement is disclosed in U.S. Pat. No. 5,934,421 where a spool valve arrangement is provided which, by moving the spool according to an electric current supplied to an actuator, directly and electrically adjusts or controls a flow path area of a bypass passage between the working chambers of the shock absorber and also adjusts a pilot pressure. The pilot pressure acts on the deflectable valve member and thus in turn controls the pressure regulating effect on a main flow. A disadvantage with the disclosed arrangement is that the bypass passage only allows relatively small flows to bypass the main flow. Consequently, the bypass fluid flow passage only has an effect at very low piston or flow speeds when the movable valve member is closed. Therefore, the disclosed arrangement only partially solves the problem of unsmooth and inaccurate damping performance at lower piston speeds.

SUMMARY OF THE INVENTION

An object of the present invention is to provide an improved valve arrangement which achieves a more precise and accurate flow restriction or damping resulting in a more smooth and dynamic damping characteristic. Another object of the present invention is to provide a compact valve arrangement which may be installed in both external and internal (piston-mounted) positions.

These and other objects are achieved by providing a valve arrangement having the features defined in the independent claim. Preferred embodiments are defined in the dependent claims.

According to an aspect of the present invention, there is provided a valve arrangement comprising a valve housing, a pilot chamber, a main valve member and a control valve member. The valve housing comprises a first and a second port. The pilot chamber is in fluid communication with the first and/or second port, wherein a pilot pressure is defined by a hydraulic pressure in the pilot chamber. The main valve member is axially movably arranged in the valve housing and is arranged to interact with a main valve seat of the valve housing in order to restrict or regulate a pressure in a main fluid flow between the first and second ports in response to the pilot pressure acting on the main valve member. The control valve member is movable in an axial direction relative the main valve member in response to an actuating force acting on the control valve member, the control valve member comprising a first pilot valve portion and a first bypass valve portion, the valve portions being at an axial distance from each other. The first pilot valve portion is arranged to interact with a second pilot valve portion of the main valve member to define a pilot restriction on a pilot fluid flow out from the pilot chamber. The first bypass valve portion is arranged to interact with a second bypass valve portion of the main valve member to define a bypass restriction on a bypass flow bypassing the main fluid flow between the first and second ports, the bypass flow being separate from the pilot flow. The pilot and bypass restrictions are adjustable in response to the actuating force, thereby allowing simultaneous adjustment of the pilot pressure and the bypass fluid flow.

The invention is based on the insight that by providing separate pilot pressure and bypass flow restrictions which are adjusted in response to a common actuating force, the effective flow restriction areas, for a given actuating force or stroke, of the two restrictions may be chosen independently from each other, whereby a greater working or flow range of the bypass fluid flow may be allowed without affecting the control of the pilot pressure. This allows a more precise and accurate flow restriction or damping resulting in a more smooth and dynamic damping characteristic. The flow is thus not only directly controlled by the actuating force at very low bypass flows, but up to a greater portion of the overall maximum flow through the valve arrangement. Thus, pressure regulating control of the flow (using the main valve member) is not activated until a higher piston or flow speed level is reached compared to known valve arrangements.

In other words, by exerting a single or common actuating force on a control valve member, separate pilot and bypass restrictions may be adjusted simultaneously. The pilot restriction restricts a pilot fluid flow, and thus indirectly a pilot pressure acting on a pressure regulating main valve member which in turn restricts a main fluid flow through the valve arrangement. The bypass restriction restricts a bypass fluid flow bypassing the main fluid flow. The pilot fluid flow is separate from the bypass fluid flow. Since the two restrictions are separate, and restrict separate flows, the effective flow path areas for the two restrictions for a given stroke of the control valve member may be different. Preferably, the effective flow path area for the bypass restrictions is chosen to be larger than the effective flow path area for the pilot restriction for a given stroke such that greater bypass flows may be adjusted by means of the bypass restriction than through the pilot restriction.

According to an embodiment of the present invention, the control valve member is arranged at least partially within said main valve member as seen in an axial direction. Hereby, a compact valve arrangement with low building height is achieved.

According to another embodiment of the present invention, the second bypass valve portion comprises an inner edge of said main valve member. The inner edge may be an edge of a groove or recess in the main valve member. The groove or recess may be in fluid communication with the second port. The groove may be an annular groove which may extend around the periphery of the control valve member.

According to yet another embodiment of the present invention, the first bypass valve portion comprises an edge of a recess in said control valve member. The recess may comprise a groove or an annular groove. It is understood that the recess or groove is a formed in an envelope surface of the control valve member. The control valve member may be essentially cylinder shaped. The recess or groove has an axial extension. The recess may be one or a plurality of radial holes bored in the envelope surface of the control valve member. The first bypass valve portion may be formed near an axial end of the control valve member to allow a short flow path between the first bypass valve portion and the first and second ports.

According to yet another embodiment of the present invention, the first bypass valve portion comprises a lower edge portion of the control valve member. In other words, the first bypass valve portion comprises the edge of the lower end of the control valve member.

According to yet another embodiment of the present invention, the first pilot valve portion comprises an edge of a recess in the control valve member. The recess in the control valve member may comprise a groove or an annular groove. The second pilot valve portion may comprise an inner edge of the main valve member. The inner edge may be an edge of a groove or of an annular groove in the main valve member. The groove may be in fluid communication via at least one radial flow opening with the second port. The first pilot valve portion may be formed near an opposite axial end of the control valve member relative to the first bypass valve portion to allow a short flow path between the first pilot valve portion and the pilot chamber.

According to yet another embodiment of the present invention, the first pilot valve portion comprises a flange portion extending radially from the control valve member. The second pilot valve portion may comprise an annular valve seat. The annular valve seat may be arranged on an upper surface of the main valve member. In other words, the control valve member may comprise a body portion and a flange portion. The body portion may be axially movably arranged at least partially within the main valve member. The flange portion has a greater radial extent or diameter than the body portion, and may thus not be moved into the main valve member. The flange portion may be arranged to interact with a valve seat or an annular valve seat located on or forming a portion of the top of the main valve member. In such an embodiment, the restriction on the pilot fluid flow may be determined by the effective flow area between the flange portion and the valve seat, i.e. the axial distance between the annular valve seat and the flange portion.

According to yet another embodiment of the present invention, the main valve member comprises a first lifting surface area arranged to axially separate the main valve member from the main valve seat in response to a hydraulic pressure in the first port, and a second lifting surface area arranged to axially separate the main valve member from the main valve seat in response to a hydraulic pressure in the second port. In other words, the main valve member may comprise a first lifting surface having a radial extent such that the pressure of the hydraulic fluid in the first port acts on the first lifting surface to exert a pressure lifting force on the main valve member. Correspondingly, the second lifting surface may have a radial extent such that the pressure of the hydraulic fluid in the second port acts on the second lifting surface to exert a pressure lifting force on the main valve member. Having such first and second lifting surfaces is advantageous since the main valve member may restrict or adjust a pressure in the main fluid flow in both directions, i.e. either from the first port to the second port or from the second port to the first port.

According to yet another embodiment of the present invention, the valve arrangement may comprise a first one-way valve arranged to allow fluid flow solely in the direction from the second pilot valve portion to the first port, and a second one-way valve arranged to allow fluid flow solely in the direction from the second pilot valve portion to the second port such that the pilot fluid flow flows from the pilot chamber to the port in which the hydraulic pressure is the lowest. In other words, a first one-way valve is arranged between the outlet of the pilot valve and the first port, and a second one-way valve is arranged between the outlet of the pilot valve and the second port. The first and second one-way valves together form a reverse valve which directs the flow from the pilot chamber to the port in which the hydraulic pressure is the lowest. The first and second one-way valves may be arranged in or on the main valve member and may be in fluid communication with the first and second ports, respectively, via flow passages in said main valve member. The first and second one-way valves may be of the ball check valve type. According to yet another embodiment of the present invention, the valve arrangement may comprise a third one-way valve arranged to allow hydraulic fluid flow solely in the direction from the first port to the pilot chamber, and a fourth one-way valve arranged to allow hydraulic fluid flow solely in the direction from the second port to the pilot chamber. The third and fourth one-way valves may be arranged in or on the main valve member and may be in fluid communication with the first and second ports, respectively, via flow passages in said main valve member. The third and fourth one-way valves may be arranged to allow essentially unrestricted flow there through, such that the pilot chamber contains hydraulic fluid with essentially the same pressure as in the first or second port. The third and fourth one-way valves may thus act as inlet valve to the pilot chamber to allow essentially unrestricted flow of hydraulic fluid into the pilot chamber. The third and fourth one-way valves may comprise a flexible or deflectable disc- or plate shaped valve member interacting with flow openings in or through the main valve member.

According to yet another embodiment of the present invention, the control valve member is formed as an integrated unit. It is understood that integrated unit refers to a member which is formed as a single or one-piece unit or which is permanently connectable together by a plurality of sub-members.

According to yet another embodiment of the present invention, the control valve member comprises a through hole for fluid communication there through, for example between the first port and the pilot chamber. This may be advantageous because essentially the same pressure acts on both axial ends of the control valve member, thereby reducing the amount of unwanted forces acting on the control valve member due to pressure differences over the control valve member. In this embodiment, the inlet of hydraulic fluid to the pilot chamber may pass through the control valve member.

According to yet another embodiment of the present invention, the space formed between the main valve member and the control valve member defines a damping volume being sealed from the first and second ports. The control valve member may comprise a through hole for fluid communication between the volume and the pilot chamber. The through hole may have a cross-section to allow essentially unrestricted fluid flow between the damping volume and the pilot chamber, This may be advantageous because essentially the same pressure acts on both sides of the control valve member, thereby reducing the amount of forces acting on the control valve member due to pressure differences over the control valve member. Because the damping volume is sealed from the first and second ports, the inlet of hydraulic fluid to the pilot chamber may pass via a flow passage through for example the main valve member or the valve housing, i.e. not through the control valve member.

According to yet another embodiment of the present invention, the valve arrangement comprises a damping flow restriction arranged to restrict fluid flow between the damping volume and the pilot chamber such that relative movement between the main valve member and the control valve member is hydraulically damped. The damping flow restriction may be arranged in the pilot valve member or control valve member and may be an orifice there through. This embodiment achieves a hydraulic damping effect on the relative movement between the control valve member and the main valve member.

According to yet another embodiment of the present invention, the valve arrangement further comprises a biasing spring arrangement arranged to resiliently load the control valve member in an opposite direction to the actuating force. The biasing spring arrangement may comprise a helical spring arranged between the main valve member and the control valve member, or alternatively between the valve housing and the control valve member. The spring force of the biasing spring arrangement is used to counteract the actuating force. This is advantageous when the actuating force is provided by an actuating arrangement providing an actuating force solely in one direction, e.g. a solenoid-based actuating arrangement. In embodiments where the actuating force is provided by an actuating arrangement having locking properties, i.e. an arrangement where the position of the actuating member is fixed when the actuator is without power, e.g. a normally locked type piezoelectric actuator or motor.

According to yet another embodiment of the present invention, the valve arrangement further comprises a failsafe spring arrangement arranged to resiliently load the control valve member relative the main valve member or valve housing in an opposite direction to the actuating force. The failsafe spring arrangement may be arranged to axially move or force the control member to a failsafe position when no actuating force is received, in which failsafe position the pilot restriction is closed and the bypass restriction is partially open to achieve a predetermined restriction on the bypass fluid flow. It is understood that the case when no actuating force is received refers to when there is electrical or mechanical malfunction to the actuating system. The failsafe spring arrangement may be arranged to resiliently load the control valve member solely when no actuating force is received. The failsafe spring arrangement may comprise a biasing spring member (as described above). The failsafe spring arrangement may alternatively comprise a failsafe spring member and an axially movable spring base member, where the spring member and the biasing spring member (as described above) are arranged in series with the spring base member there between. The spring stiffness of the failsafe spring member may be lower than the stiffness of the biasing spring member. The spring stiffness of the failsafe spring member may be chosen such that the spring base member is inoperable during normal operation, i.e. when an actuating force is received. For example, the spring base member may rest against the control or main valve member during normal operation, and may be released from the control or main valve member during failsafe operation, i.e. when no actuating force is received. Consequently, during failsafe operation, the failsafe spring member and the biasing spring member act together (in series) to force the control valve member to the failsafe position. Thereby, a strong spring force is obtained to reliably keep the control valve member in the desired failsafe position while in failsafe mode.

According to yet another embodiment of the present invention, the main valve member interacts with the main valve seat to form a down-stream restrictor and an up-stream restrictor in view of the main fluid flow, the down-stream restrictor having a larger radial extent or diameter than the up-stream restrictor, thereby varying their restriction on the main fluid flow differently from each other in response to the pilot pressure acting on the main valve member. In other words, the restrictions of the down-stream restrictor and the up-stream restrictor vary differently from each other for a given stroke of the main valve member. It is understood that the main fluid flow flows from the first port via the up-stream restrictor and thereafter via the down-stream restrictor to the second port. The down-stream restrictor may be arranged to achieve great influence upon the size of the restrictor function with small strokes and less influence or shut-off effect with large strokes, and the up-stream restrictor may be arranged to achieve little influence upon the size of the restrictor function with small strokes and greater influence upon the last-named size with large strokes. Such a configuration may be achieved by arranging the up-stream restrictor to be partially open and the down-stream restrictor to be fully closed when the main valve member rests against the main valve seat. This embodiment is advantageous because the two series-connected (down- and up-stream) restrictors may be used to form together a restrictor function in the valve arrangement in question to achieve a smooth flow restriction characteristics in at least the introductory and concluding part of the opening and closing function respectively by mutually altering their restrictor sizes, preferably successively, in dependence upon the present stroke size. It is understood that this embodiment is preferably used for valve arrangements for one-way flows only.

According to yet another embodiment of the present invention, the main valve member may comprise an annular groove to form first and second annular portions. The first annular portion of the main valve member may be arranged to interact with the main valve seat to form the up-stream restrictor. The second annular portion of the main valve member may be arranged to interact with the main valve seat to form the down-stream restrictor. Alternatively, the main valve member may comprise an annular groove to form first and second annular portions, and the main valve seat comprises an annular groove to form first and second annular valve seat portions. The first annular portion of the main valve member may be arranged to interact with the first annular seat portion to form the up-stream restrictor. The second annular portion of the main valve member may be arranged to interact with the second annular seat portion to form the down-stream restrictor. This embodiment may achieve two areas which are dependent upon the size of the respective stroke and define directly area-related outer and inner restrictors. When stroke sizes are small, the outer restrictor is smaller in size (i.e. it has greater influence upon the process in question) than the inner restrictor. As stroke sizes increase, the inner restrictor is smaller in size (i.e. it has greater influence upon the process in question) than the outer restrictor. The said change in the sizes of the restrictors has the effect that an intermediate pressure which arises between the restrictors successively diminishes or increases during a respective first and second part of the opening and closing function respectively. The moving main valve member works with two pressure areas, the differential area of which can be acted upon by the said intermediate pressure to create a force which forms the basis of a smooth curve shape in connection with the introductory or concluding part of the opening and closing function respectively.

BRIEF DESCRIPTION OF THE DRAWINGS

Further details and aspect of the present invention will become apparent from the following detailed description with reference to accompanying drawings, in which.

DETAILED DESCRIPTION OF EMBODIMENTS

The present invention will now further be described in connection with the accompanying drawings.

Figure 1:
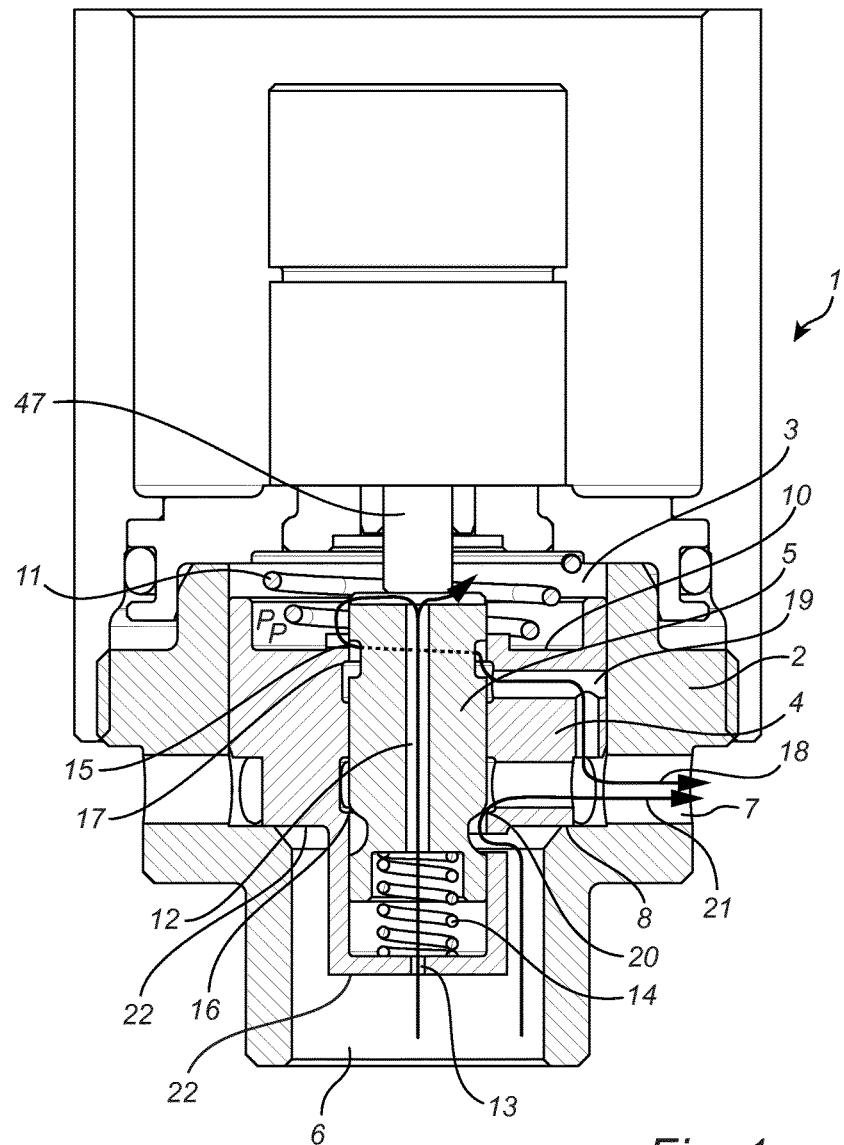
FIG. 1 shows a first embodiment of a valve arrangement according to the present invention, where the main valve member is in a closed position to block a main fluid flow from the first port to the second port.

FIG. 1 shows a first embodiment of a valve arrangement according to the present invention. The valve arrangement 1 comprises a valve housing 2, a pilot chamber 3, a main valve member 4 and a control valve member 5. The valve housing 2 comprises a first and a second port 6, 7. In the first embodiment, the first and second ports act as inlet and outlet ports, respectively, for inlet and outlet of hydraulic fluid. The main valve member 4 is axially movably arranged in the valve housing 2 and is arranged to interact with a main valve seat 8 of the valve housing in order to restrict (or regulate a pressure) in a main fluid flow from the first port 6 to the second port 7 in response to a pilot pressure Pp acting on an upper surface 10 of the main valve member. In this embodiment, the main valve member 4 is resiliently loaded towards the main valve seat towards a closed position by a main helical spring member 11 acting on the upper surface 10 of the main valve member. In other embodiments, the main valve member may be resiliently loaded by other types of spring members or may be flexible and/or resilient itself to achieve the desired resilient loading.

The pilot chamber 3 is defined by the space formed between the upper surface 10 of the main valve member and inner walls of the valve housing 2. The pilot chamber 3 is in fluid communication with the first port 6 via an axial through hole 12 in the control valve member 5 and an axial through hole 13 in a bottom portion of the main valve member 4. The pilot pressure acting on the upper surface 10 of the main valve member 4 is defined by a hydraulic pressure in the pilot chamber 3. The axial through hole 12 in the control valve member 5 also results in that essentially the same pressure acts on both axial end surfaces of the control valve member 5, thereby eliminating the need for the actuating force to overcome a force resulting from a pressure difference over the control valve member. The axial through hole 13 may have a relatively small cross-section such that it acts as a flow restricting orifice to limit the inflow of hydraulic fluid from the first port 6 to the space formed between the lower end of the control valve member 5 and the inner surface of the cup-shaped lower end of the main valve member 4. This may dynamically reduce the pressure difference over the control valve member.

The control valve member 5 is of a substantially cylindrical shape and is arranged coaxially with and partially within the main valve member, and extends above the upper surface 10 into the pilot chamber 3. The control valve member 5 is furthermore movable in an axial direction relative the main valve member in response to an actuating force acting on the control valve member. In this embodiment, the actuating force is received by an actuating rod 47. The actuating rod may be an axially movable magnetic member on which a solenoid exerts a force in response to an electric current. A helical biasing spring member 14 is arranged between the main valve member 4 and the control valve member 5 to resiliently load the control valve member against or towards the actuating rod 47. In an alternative embodiment, no biasing spring member 14 is used since the actuator is of a normally locked type, e.g. a piezoelectric actuator or motor.

The control valve member 5 comprises a first pilot valve portion 15 in the form of an edge of a first annular groove in the envelope surface of the control valve member. The control valve member furthermore comprises a first bypass valve portion 16 in the form of an edge of a second annular groove in the envelope surface of the control valve member. The annular grooves are at an axial distance from each other.

The first pilot valve portion 15 is arranged to interact with a second pilot valve portion 17 of the main valve member 4 to achieve a pilot restriction on a pilot fluid flow 18 from the pilot chamber to the second port. The second pilot valve portion is an inner edge of a radial flow opening 19 in fluid communication with the second port 7. When the control valve member 5 moves axially in response to the actuating force, the overlap between the grooves in the control valve member and the main valve member (the edges of which form the first and second pilot valve portions) varies, thereby adjusting the effective flow restriction area on the pilot fluid flow 18. Consequently, the pilot pressure may be adjusted by adjusting the actuating force.

The first bypass valve portion 16 is arranged to interact with a second bypass valve portion 20 of the main valve member 4 to define a bypass restriction on a bypass fluid flow 21 from the first port to the second port. The bypass fluid flow bypasses the main fluid flow, the bypass flow being separate from the pilot flow. When the control valve member 5 moves axially in response to the actuating force, the overlap between the grooves in the control valve member and the main valve member (the edges of which form the first and second bypass valve portions) varies, thereby adjusting the effective flow restriction area on the bypass fluid flow 21.

In FIG. 1, the hydraulic pressure in the first port acting on the bottom surface 22 of the main valve member is not sufficient to overcome the opposing forces of the main helical spring member and the pilot pressure acting on the main valve member. This may be the case when the speed is low such that the hydraulic pressure in the working chamber of the shock absorber coupled to the first port is also low. The main valve member is thus in a closed position, i.e. in abutment with the main valve seat to block the main fluid flow from the first port to the second port. However, the bypass restriction is open to allow a bypass fluid flow 21.

Figure 2:
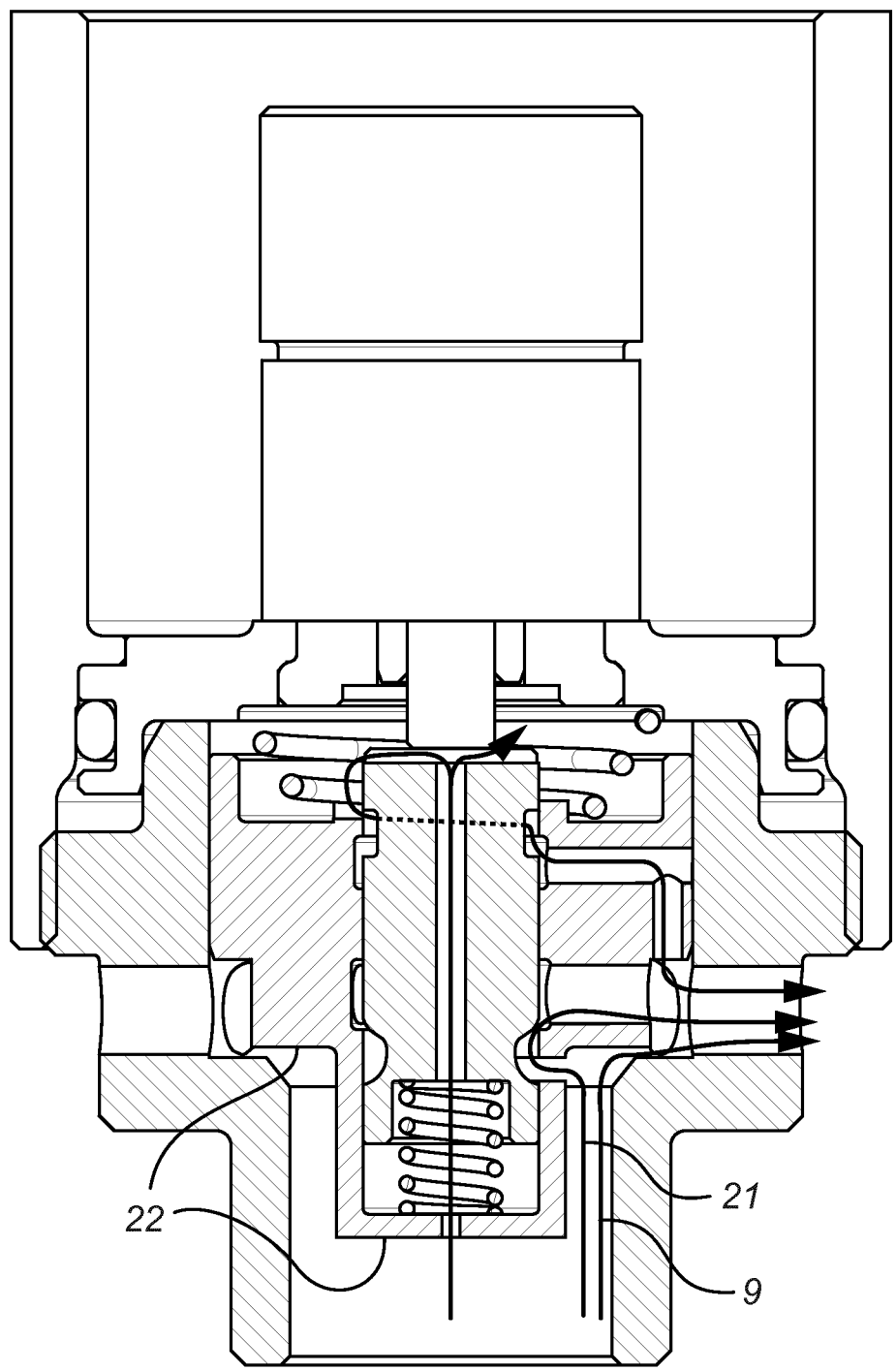
FIG. 2 shows the first embodiment when the main valve member is in an open position to allow a main fluid flow from the first port to the second port.

FIG. 2 shows the first embodiment when the main valve member is in an open position to allow a main fluid flow 9 from the first port to the second port. In this case, the hydraulic pressure in the first port acting on the bottom surface 22 of the main valve member is sufficient to overcome the opposing forces of the main helical spring member and the pilot pressure acting on the main valve member. The restriction on the main fluid flow is adjustable by adjusting the pilot pressure by adjusting the restriction on the pilot fluid flow from the pilot chamber to the second port. This adjustment is achieved by adjusting the actuating force acting on the control valve member. The restriction of the main fluid flow 9 is thus of the pressure regulating type. Note that the bypass restriction is also open to allow a bypass fluid flow 21 in parallel with the main fluid flow.

Figure 3:
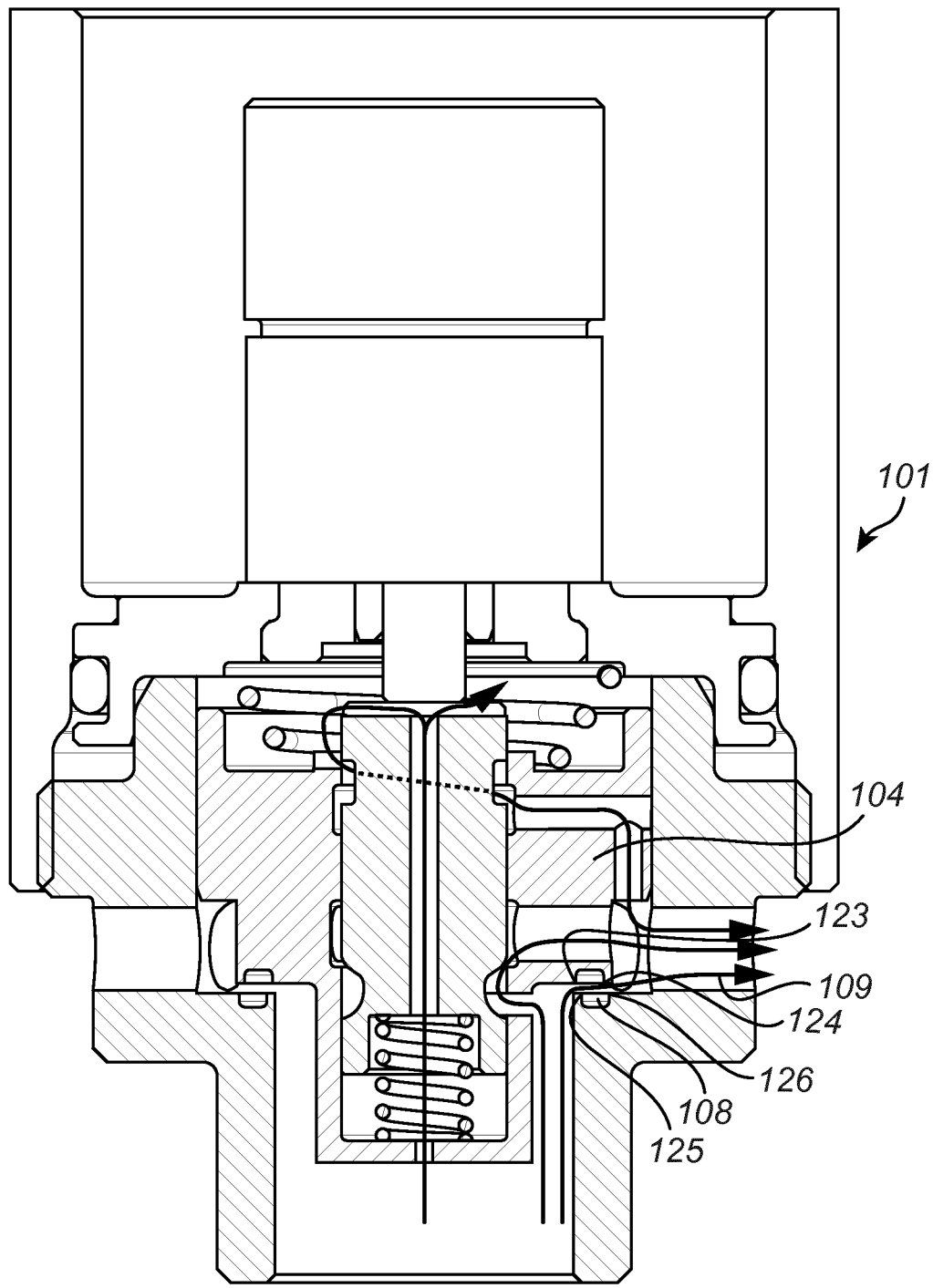
FIG. 3 shows a second embodiment of a valve arrangement according to the present invention, in which the main valve member and the main valve seat are configured for a soft opening characteristic.

FIG. 3 shows a second embodiment of a valve arrangement according to the present invention. The second embodiment is similar to the first embodiment, but has a different geometry of the main valve member and main valve seat. The portion of the main valve member 104 which faces towards the main valve seat 108 has an annular groove to form first and second annular portions 123, 124. The main valve seat 108 has an annular groove in the surface facing the main valve member 104 to form first and second annular valve seat portions 125, 126. The first annular portion 123 of the main valve member has a diameter corresponding to that of the first annular seat portion 125 to form an up-stream restriction on the main fluid flow 109. The second annular portion 124 of the main valve member has a diameter corresponding to that of second annular seat portion 126 to form a down-stream restriction on the main fluid flow 109. Because the down-stream restriction and up-stream restriction have different diameters, their restriction on the main fluid flow varies differently from each other for a given stroke of the main valve member, i.e. varies differently in response to a given pilot pressure acting on the main valve member. In other words, for a given stroke of the main valve member, i.e. a given lifting distance between the main valve member and the main valve seat, the up-stream restriction provides a smaller effective flow restriction area, i.e. a greater restriction on the flow, than the down-stream restriction.

Figure 4:
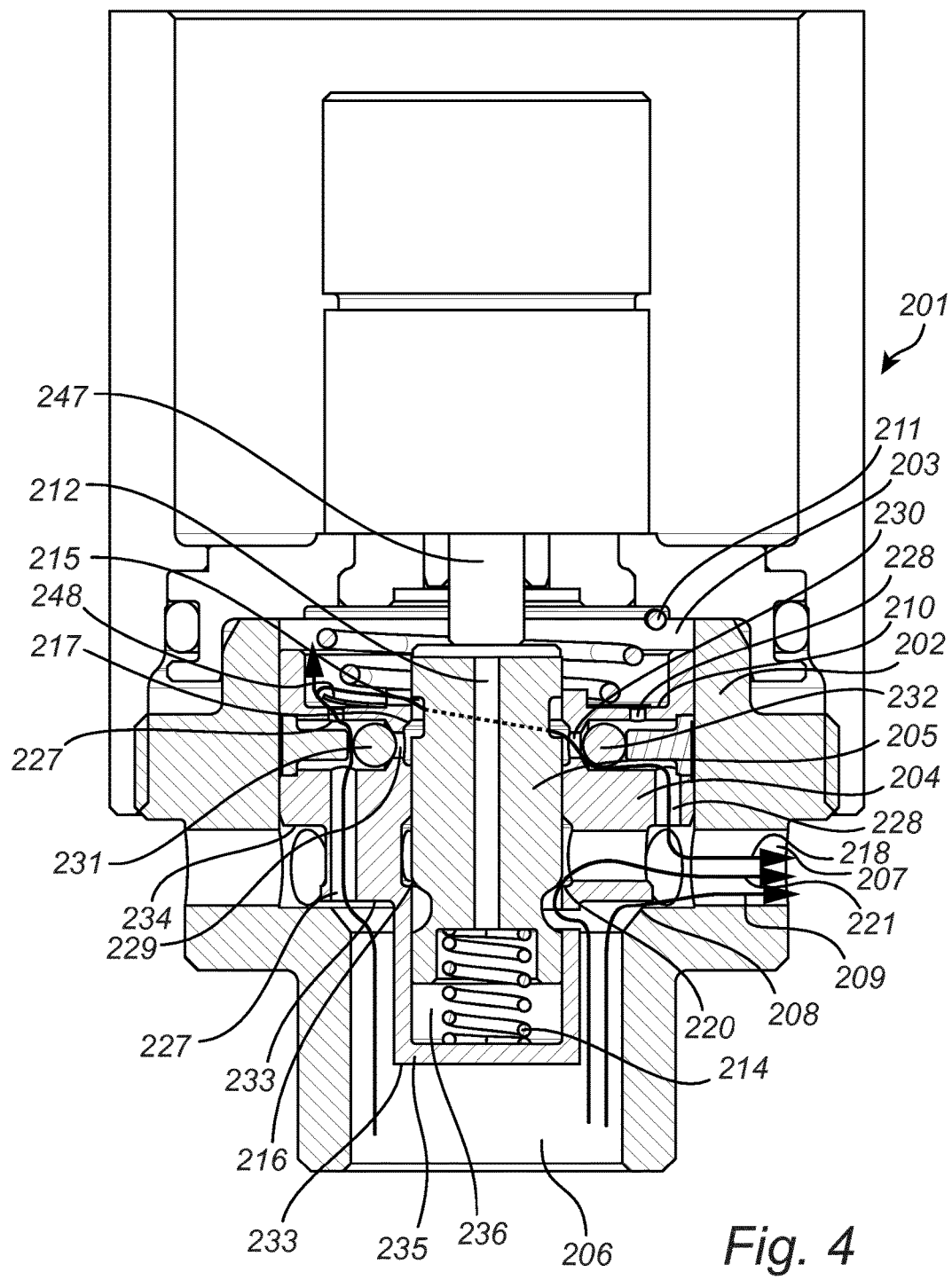
FIG. 4 shows a third embodiment of a valve arrangement according to the present invention, in which the valve arrangement is configured for restricting fluid flows in both directions between the first and second ports, where a flow direction from the first port to the second port is illustrated.
Figure 5:
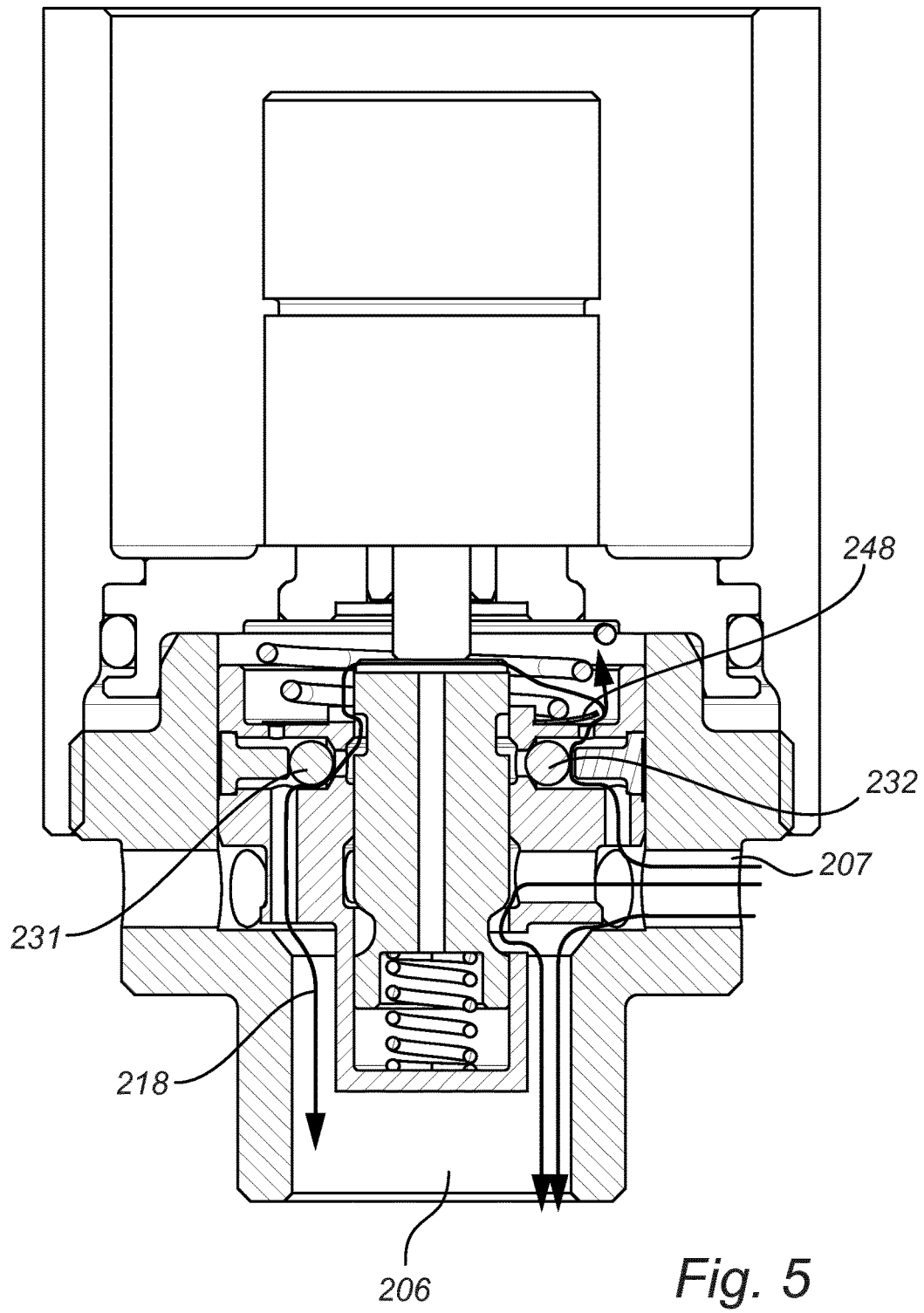
FIG. 5 shows the third embodiment where a flow direction from the second port to the first port is illustrated.

FIGS. 4 and 5 show a third embodiment of a valve arrangement 201 according to the present invention, in which the valve arrangement is configured for restricting fluid flows in both directions between the first and second ports. In FIG. 4, a flow direction from the first port 206 to the second port 207 is illustrated, and in FIG. 5, a flow direction from the second port 207 to the first port 206 is illustrated. The valve arrangement 201 comprises a valve housing 202, a pilot chamber 203, a main valve member 204 and a control valve member 205. The valve housing 202 comprises a first and a second port 206, 207. In the third embodiment, the first and second ports act alternately as inlet and outlet ports for inlet and outlet of hydraulic fluid. The main valve member 204 is axially movably arranged in the valve housing 202 and is arranged to interact with a main valve seat 208 of the valve housing in order to restrict (or regulate a pressure) in a main fluid flow 209 between the first and second ports 206, 207 in response to a pilot pressure acting on an upper surface 210 of the main valve member. The main valve member 204 is resiliently loaded towards the main valve seat towards a closed position by a main helical spring member 211 acting on the upper surface 210 of the main valve member.

The pilot chamber 203 is defined by the space formed between the upper surface 210 of the main valve member and inner walls of the valve housing 202. The pilot chamber 203 is in fluid communication with the first port 206 via a first axial through hole 227 in the main valve member 204 and with the second port 207 via a second axial through hole 248 in the main valve member 204. A disc- or plate-shaped one-way valve member which is flexible or deflectable in the axial direction is arranged on the upper surface 210 of the main valve member to cover the axial through holes 227 and 228, thereby forming a third one-way valve to allow hydraulic fluid flow through the first axial through hole 227 solely in the direction from the first port to the pilot chamber, and a fourth one-way valve to allow hydraulic fluid flow through the second axial through hole 228 solely in the direction from the second port to the pilot chamber. The pilot pressure acting on the upper surface 10 of the main valve member 204 is defined by a hydraulic pressure in the pilot chamber 203. In other embodiments, the one-way valves may be of another type, for example of the ball-valve type.

The control valve member 205 is of a substantially cylindrical shape and is arranged coaxially with and partially within the main valve member, and extends above the upper surface 210 into the pilot chamber 203. The control valve member 205 is furthermore movable in an axial direction relative the main valve member in response to an actuating force acting on the control valve member. In this embodiment, the actuating force is received by an actuating rod 247. The actuating rod may be an axially movable magnetic member on which a solenoid exerts a force in response to an electric current. A helical biasing spring member 214 is arranged between the main valve member 204 and the control valve member 205 to resiliently load the control valve member against or towards the actuating rod 247.

The control valve member 205 comprises a first pilot valve portion 215 in the form of an edge of a first annular groove in the envelope surface of the control valve member. The control valve member furthermore comprises a first bypass valve portion 216 in the form of an edge of a second annular groove in the envelope surface of the control valve member. The annular grooves 215, 216 are at an axial distance from each other.

The first pilot valve portion 215 is arranged to interact with a second pilot valve portion 217 of the main valve member 204 to achieve a pilot restriction on a pilot fluid flow 218 out from the pilot chamber to the second port. The second pilot valve portion comprises an inner edge of a first radial flow opening 229 in fluid communication with the first port 206 via the first axial through hole 227, and an inner edge of a second radial flow opening 230 in fluid communication with the second port 207 via the second axial through hole 228.

A first one-way valve 231 of the ball-valve type is arranged in the flow path between the first radial flow opening 229 and the first axial through hole 227 to allow fluid flow solely in the direction from the pilot valve to the first port. A second one-way valve 232 of the ball-valve type is arranged in the flow path between the second radial flow opening 230 and the second axial through hole 228 to allow fluid flow solely in the direction from the pilot valve to the second port. The two one-way valves 231, 232 together form a directional valve arrangement ensuring that the pilot fluid flow flows to the port in which the hydraulic pressure is the lowest. In FIG. 4, the pressure in the first port 206 is higher than the pressure in the second port 207, therefore the first one-way valve 231 is closed to prevent pilot fluid flow from the pilot chamber 203 to the first port 206, while the second one-way valve 232 is open to allow pilot fluid flow from the pilot chamber 203 to the second port 207. It is understood that the ball of the first one-way valve is held in closed position by the pressure difference over the pilot restriction, and that the ball of the second one-way valve is moved to an open position by the pilot fluid flow. In FIG. 5, pressure in the second port 207 is higher than the pressure in the first port 206, and the one-way valves 231, 232 are in opposite positions compared to in FIG. 4 to allow pilot fluid flow from the pilot chamber 203 to the first port 6. Thus, the two one-way valves work independently of each other, but in response to the same pressures and pressure differences to achieve the desired directional valve functionality.

When the control valve member 205 moves axially in response to the actuating force, the overlap between the grooves in the control valve member and in the main valve member (the edges of which form the first and second pilot valve portions) varies, thereby adjusting the effective flow restriction area on the pilot fluid flow 218. Consequently, the pilot pressure may be adjusted by adjusting the actuating force.

The first bypass valve portion 216 is arranged to interact with a second bypass valve portion 220 of the main valve member 204 to define a bypass restriction on a bypass fluid flow 221 from the first port to the second port. The bypass fluid flow bypasses the main fluid flow 209. The bypass flow is separate from the pilot flow 218. When the control valve member 205 moves axially in response to the actuating force, the overlap between the grooves in the control valve member and in the main valve member (the edges of which form the first and second bypass valve portions) varies, thereby adjusting the effective flow restriction area on the bypass fluid flow 221.

The main valve member 4 comprises a first lifting surface area 233 at its bottom surface. The lifting surface 233 is defined as the surface area which the hydraulic pressure in the first port 206 exerts a pressure force on, i.e. the annular surface adjacent to the main valve seat 208 and the bottom surface area of the cup-shaped portion 235. When a hydraulic pressure in the first port 206 acts on the area 233, and this pressure is sufficient to overcome the pilot pressure acting on the opposite side of the main valve member and the force of the main helical spring member 211, the main valve member 204 is moved axially upwards and is consequently released from the main valve seat to allow a main fluid flow between the main valve member and the main valve seat from the first port to the second port. This case is illustrated in FIG. 4.

The main valve member 204 comprises a second annular lifting surface area 234. This area is defined by a difference in diameter between an upper and a lower portion of the main valve member. When a hydraulic pressure in the second port 207 acts on the area 234, and this pressure is sufficient to overcome the pilot pressure acting on the opposite side of the main valve member and the force of the main helical spring member 211, the main valve member 204 is moved axially upwards and is consequently released from the main valve seat to allow a main fluid flow between the main valve member and the main valve seat from the second port to the first port. This case is illustrated in FIG. 5.

The space formed between the lower end of the control valve member 205 and the inner surface of the cup-shaped lower end 235 of the main valve member 204 defines a damping volume 236 being sealed from the first and second ports 206, 207. The control valve member 205 has a through hole 212 extending in the axial direction there through for fluid communication between the damping volume 236 and the pilot chamber 203. The sealed volume and the axial through hole 212 in the control valve member 205 together contribute to that essentially the same (static) pressure acts on both axial end surfaces of the control valve member 205, thereby eliminating the need for the actuating force to overcome a force resulting from a pressure difference over the control valve member.

Figure 6:
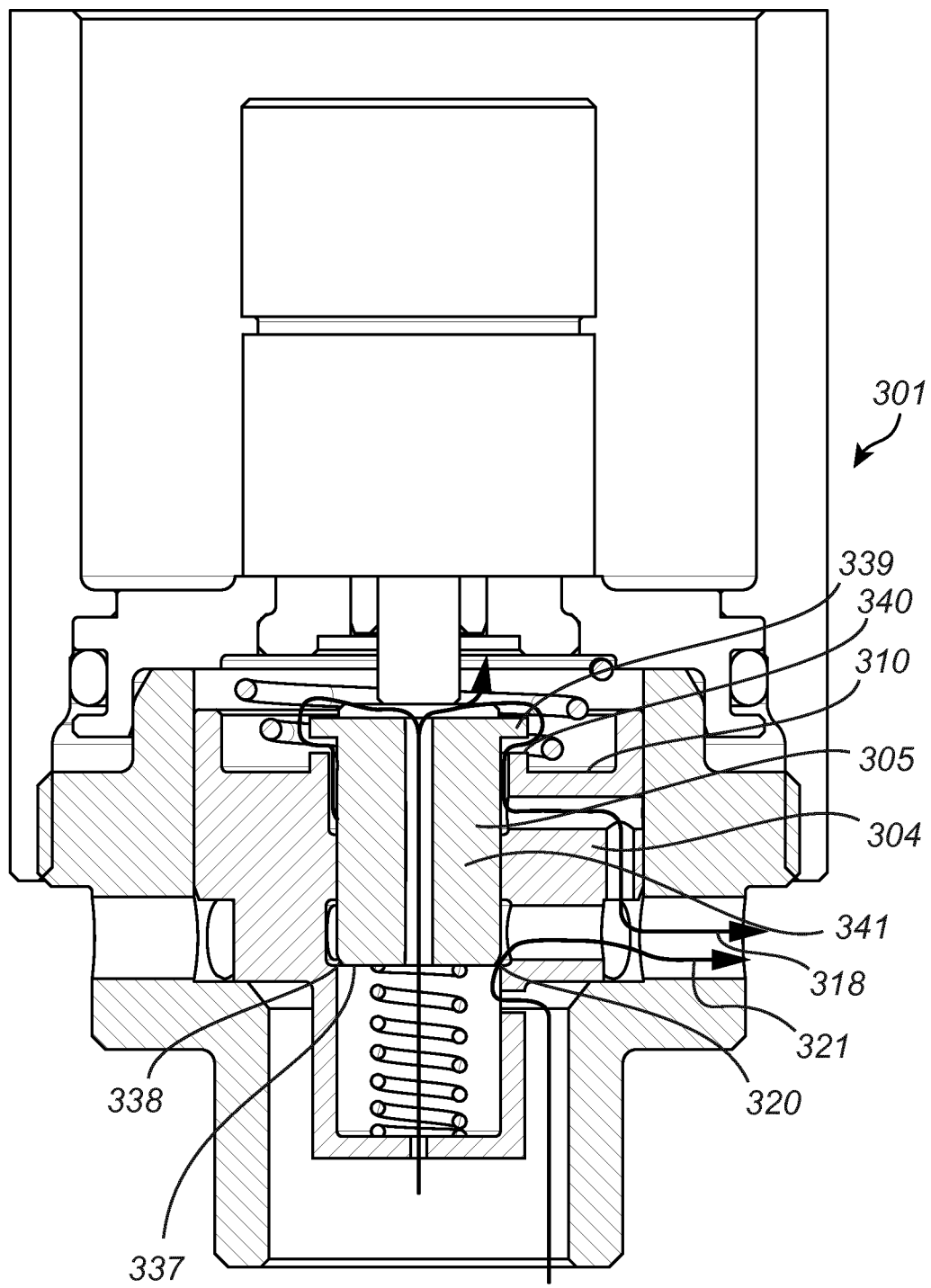
FIG. 6 shows a fourth embodiment of a valve arrangement according to the present invention similar to the first embodiment but with alternative pilot and bypass valve configurations.

FIG. 6 shows a fourth embodiment of a valve arrangement according to the present invention. The fourth embodiment differs from the first embodiment in that the pilot and bypass valve configurations are different. The control valve member has an essentially plane lower end surface portion 337, and the first bypass valve portion comprises an edge 338 of this lower end surface portion. The first pilot valve portion comprises a flange portion 339 extending radially from the control valve member 305. The second pilot valve portion comprises an annular valve seat 340 arranged on the upper surface 310 of the main valve member 304. The control valve member may be described as having a body portion 341 which is axially movably arranged at least partially within the main valve member 304, and a flange portion 339 that has a greater diameter than the body portion. The flange portion interacts with the annular valve seat 340 to form the pilot restriction there between. The restriction on the pilot fluid flow is thus determined by the effective flow area between the flange portion and the valve seat, i.e. the axial distance between the annular valve seat and the flange portion.

Figure 7:
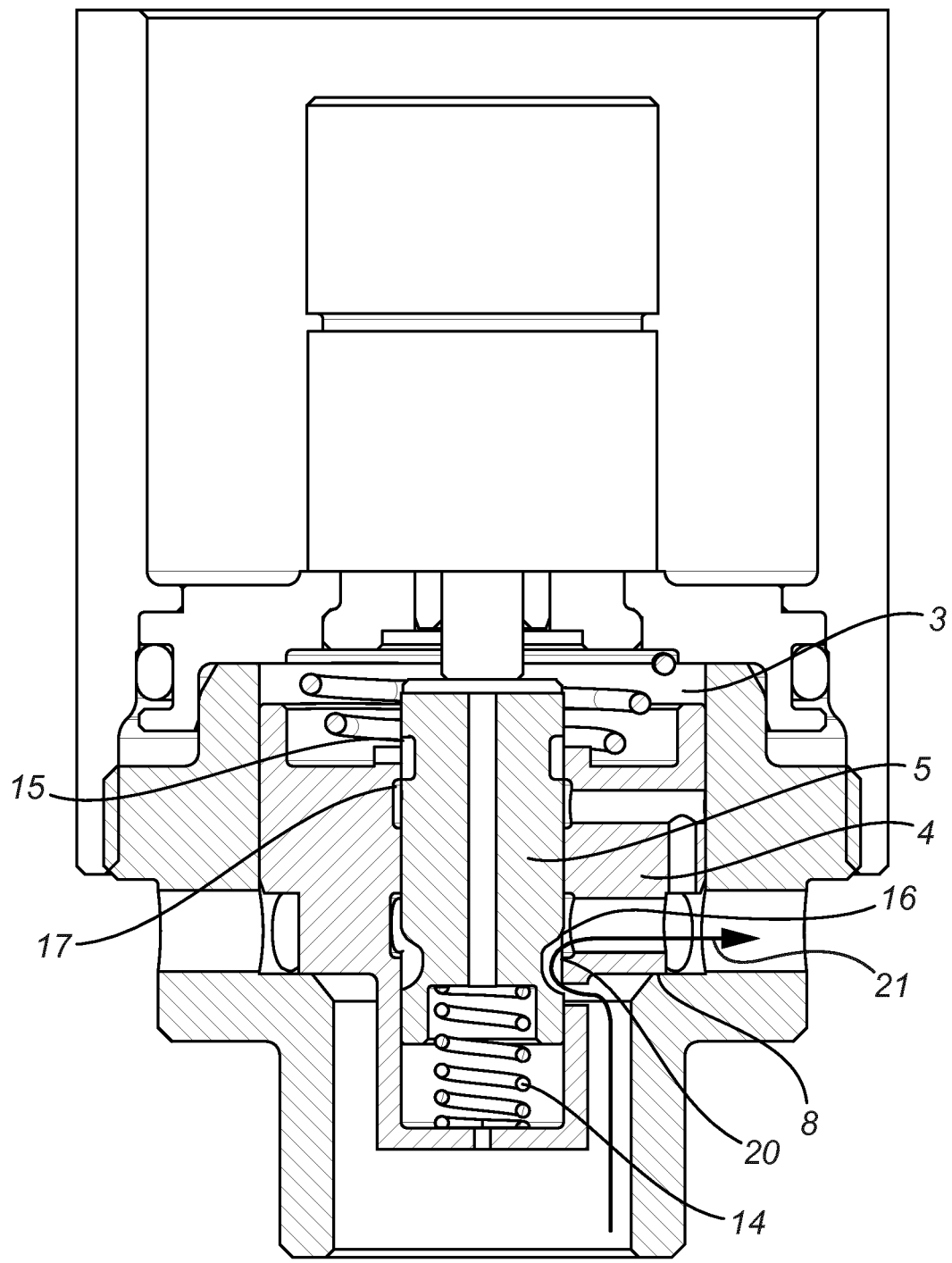
FIG. 7 shows the first embodiment when the control valve member is in a failsafe position.

FIG. 7 shows the first embodiment when the control valve member is in a failsafe position. In the figure, a case when no actuating force is received is illustrated, i.e. for example when there is electrical or mechanical malfunction to the actuating system. Since no actuating force is received, the biasing spring member 14 forces the control member 5 upwards to the illustrated failsafe position, in which failsafe position the pilot restriction is closed and the bypass restriction is partially open to achieve a predetermined restriction on the bypass fluid flow 21. In the failsafe position, the annular grooves in the control valve member and the main valve member having the edges which form the first and second pilot valve portions 15, 17 are non-overlapping, consequently closing the pilot restriction to block any fluid flow out from the pilot chamber 3. Since the pilot restriction is closed, the pressure of the hydraulic fluid in the pilot chamber 3 will prevent the main valve member 4 from being released or lifted from the main valve seat 8. The annular grooves in the control valve member and the main valve member having the edges which form the first and second bypass valve portions 16, 20 are overlapping to leave the bypass restriction partially open in a predetermined position in the failsafe position. In the failsafe position, the overall flow from the first to the second port is thus determined solely by the predetermined restriction on the bypass fluid flow 21 defined by the failsafe position of the control valve member relative the main valve member.

Figure 8:
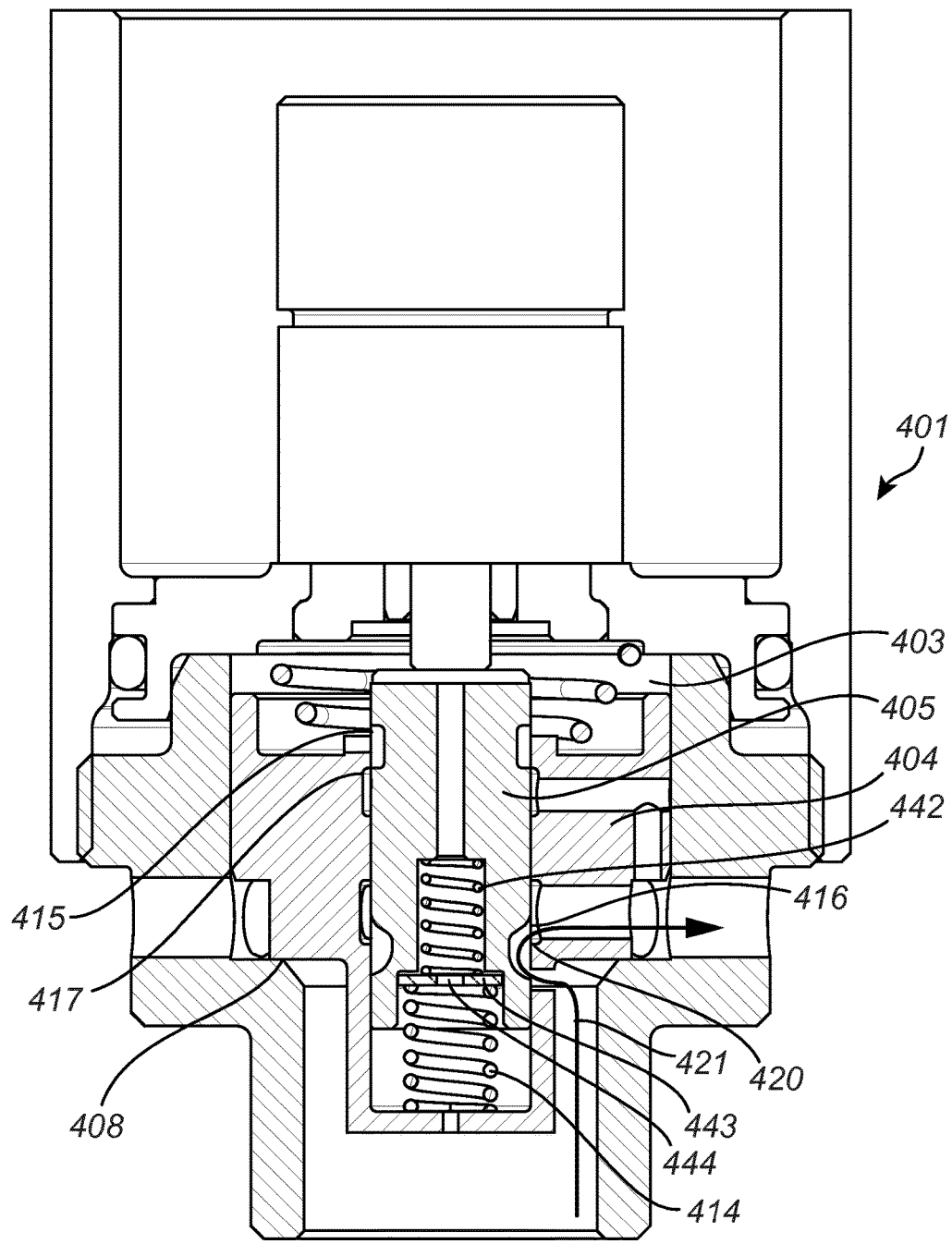
FIG. 8 shows a fifth embodiment of a valve arrangement according to the present invention when the control valve member is in a failsafe position.

FIG. 8 shows a fifth embodiment of a valve arrangement 401 according to the present invention when the control valve member 405 is in a failsafe position. In this embodiment, a failsafe spring member 442 is arranged at least partially within the control valve member. The failsafe spring member 442 acts on the control valve member 405 and on an axially movable spring base member 443 being essentially disc-shaped with a through hole 444 for fluid communication there through. The biasing spring member 414 acts on the opposite side of the spring base member 443. The spring stiffness of the failsafe spring member 442 is lower than the stiffness of the biasing spring member 414 such that the spring base member rests against the control valve member during normal operation, i.e. when a non-negligible actuating force is received, and is released from the control valve member during failsafe operation (as illustrated), i.e. when no actuating force is received. During failsafe operation, the failsafe spring member 442 and the biasing spring member 414 act together (in series) to force the control valve member 405 to the illustrated failsafe position. In the failsafe position, the pilot restriction is closed and the bypass restriction is partially open to achieve a predetermined restriction on the bypass fluid flow. In the failsafe position, the annular grooves in the control valve member and the main valve member having the edges which form the first and second pilot valve portions 415, 417 are non-overlapping, consequently closing the pilot restriction to block any fluid flow out from the pilot chamber 403. Since the pilot restriction is closed, the pressure of the hydraulic fluid in the pilot chamber 403 will prevent the main valve member 404 from being released or lifted from the main valve seat 408. The annular grooves in the control valve member and the main valve member having the edges which form the first and second bypass valve portions 416, 420 are overlapping to leave the bypass restriction partially open in a predetermined position in the failsafe position. In the failsafe position, the overall flow from the first to the second port is thus determined solely by the predetermined restriction on the bypass fluid flow 421 defined by the failsafe position of the control valve member relative the main valve member.

Figure 9:
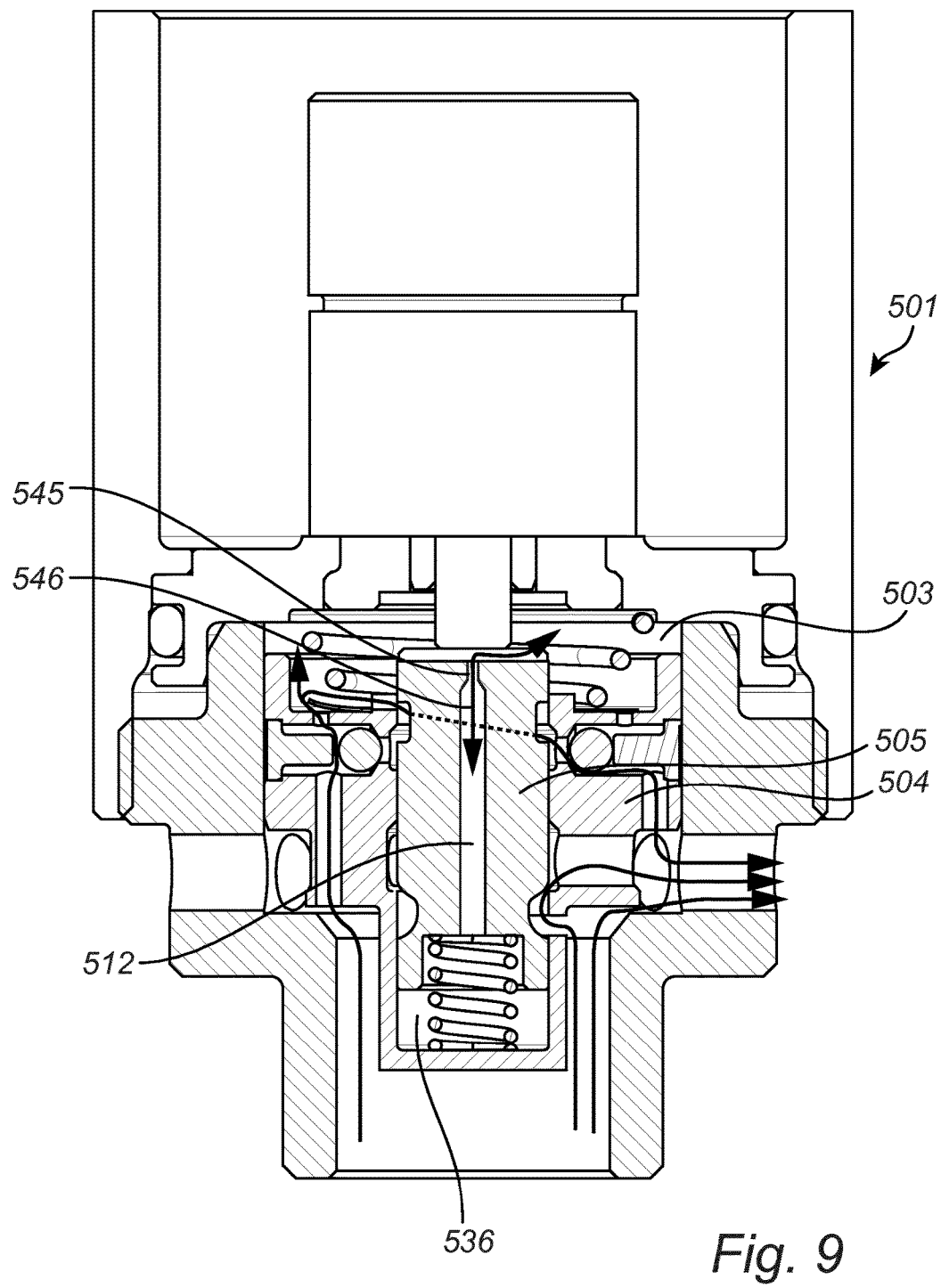
FIG. 9 shows a sixth embodiment of a valve arrangement according to the present invention.

FIG. 9 shows a sixth embodiment of a valve arrangement 501 according to the present invention. The sixth embodiment differs from the third embodiment (shown in FIGS. 4 and 5) merely in that the axial through hole 512 through the control valve member 505 comprises a portion 545 with smaller diameter compared to the rest of the through hole, the smaller diameter of which causing the portion to act as a damping flow restriction arranged to bidirectionally restrict a fluid flow 546 between the damping volume and the pilot chamber (as indicated by the bi-directional arrow in FIG. 9) such that relative movement between the main valve member and the control valve member is hydraulically damped.

Although exemplary embodiments of the present invention have been shown and described, it will be apparent to the person skilled in the art that a number of changes and modifications, or alterations of the invention as described herein may be made. Thus, it is to be understood that the above description of the invention and the accompanying drawing is to be regarded as a non-limiting example thereof and that the scope of the invention is defined in the appended patent claims.

The invention claimed is:

1. A valve arrangement (1; 101; 201; 301; 401) for a shock absorber, said valve arrangement comprising:
   a valve housing (2; 202) comprising a first and a second port (6, 7; 206, 207)
   a pilot chamber (3; 203; 403) being in fluid communication with said first and/or second port, wherein a pilot pressure (Pp) is defined by a hydraulic pressure in said pilot chamber;
   a main valve member (4; 104; 204; 304; 404; 504) being axially movably arranged in said valve housing and being arranged to interact with a main valve seat (8; 108; 208; 408) of said valve housing in order to restrict a main fluid flow (9; 109; 209) between said first and second ports in response to said pilot pressure acting on said main valve member;
   a control valve member (5; 205; 305; 405) being movable in an axial direction relative said main valve member in response to an actuating force acting on said control valve member, said control valve member comprising a first pilot valve portion (15; 215; 339; 415) and a first bypass valve portion (16; 216; 338; 416), said valve portions being at an axial distance from each other, said first pilot valve portion (15; 215; 339; 415) being arranged to interact with a second pilot valve portion (17; 217; 340; 417) of said main valve member to define a pilot restriction on a pilot fluid flow (18; 218; 318) out from said pilot chamber;

said first bypass valve portion (16; 216; 416) being arranged to interact with a second bypass valve portion (20; 220; 420) of said main valve member to define a bypass restriction on a bypass flow (21; 221; 321; 421) between said first and second ports, said bypass flow being separate from said pilot flow;

wherein said pilot and bypass restrictions are adjustable in response to said actuating force, thereby allowing simultaneous adjustment of said pilot pressure and said bypass fluid flow.

2. The valve arrangement according to claim 1, wherein said control valve member (5; 205; 305; 405) is arranged at least partially within said main valve member (4; 104; 204; 304; 404).

3. The valve arrangement according to claim 1, wherein the second bypass valve portion (20; 220; 320; 420) comprises an inner edge of said main valve member.

4. The valve arrangement according to claim 3, wherein the first bypass valve portion (16; 216; 338; 416) comprises an edge of a recess in said control valve member (5; 205; 305; 405).

5. The valve arrangement according to claim 4, wherein said recess comprises an annular groove.

6. The valve arrangement according to claim 3, wherein the first bypass valve portion (338) comprises a lower edge portion of said control valve member (305).

7. The valve arrangement according to claim 1, wherein the first pilot valve portion (15; 215; 415) comprises an edge of a recess in said control valve member (5; 205; 405) and wherein the second pilot valve portion (17; 217; 417) comprises an inner edge of said main valve member (4; 104; 204; 404).

8. The valve arrangement according to claim 7, wherein said recess comprises an annular groove.

9. The valve arrangement according to claim 1, wherein the first pilot valve portion comprises a flange portion (339) extending radially from said control valve member (305), and wherein the second pilot valve portion is an annular valve seat (340).

10. The valve arrangement according to claim 1, wherein said main valve member comprises a first lifting surface area (233) arranged to axially separate said main valve member (204) from said main valve seat (208) in response to a hydraulic pressure in said first port (206), and a second lifting surface area (234) arranged to axially separate said main valve member (204) from said main valve seat (208) in response to a hydraulic pressure in said second port (207).

11. The valve arrangement according to claim 1, further comprising a first one-way valve (231) arranged to allow fluid flow solely in the direction from said second pilot valve portion (217) to said first port (206), and a second one-way valve (232) arranged to allow fluid flow solely in the direction from said second pilot valve portion (217) to said second port (207).

12. The valve arrangement according to claim 1, further comprising a third one-way valve (248) arranged to allow hydraulic fluid flow solely in the direction from said first port (206) to said pilot chamber (203), and a fourth one-way valve (248) arranged to allow hydraulic fluid flow solely in the direction from said second port (207) to said pilot chamber (203).

13. The valve arrangement according to claim 1, wherein said control valve member (5; 205; 305; 405; 505) is formed as an integrated unit.

14. The valve arrangement according to claim 1, wherein said control valve member (5; 205; 505) comprises a through hole (12; 212; 512) for fluid communication there through.

15. The valve arrangement according to claim 1, wherein a space formed between said main valve member and the control valve member defines a damping volume (236; 536) being sealed from the first and second ports (206, 207), and wherein said control valve member (205; 505) comprises a through hole (212; 512) for fluid communication between said volume and said pilot chamber.

16. The valve arrangement according to claim 15, further comprising a damping flow restriction (545) arranged to restrict fluid flow between said damping volume (536) and said pilot chamber (503) such that relative movement between said main valve member (504) and said control valve member (505) is hydraulically damped.

17. The valve arrangement according to claim 1, further comprising a failsafe spring arrangement (14; 214; 414) arranged to resiliently load said control valve member (5; 205; 405) relative said main valve member (4; 204; 404) in an opposite direction to said actuating force.

18. The valve arrangement according to claim 1, wherein said main valve member (104) interacts with said main valve seat (108) to form a down-stream restrictor (124, 126) and an upstream restrictor (123, 125) in view of said main fluid flow (109), said down-stream restrictor having a larger radial extent than said up-stream restrictor, thereby varying their restriction on the main fluid flow differently from each other in response to said pilot pressure acting on said main valve member.

19. The valve arrangement according to claim 18, wherein said main valve member (104) comprises an annular groove to form first and second annular portions (123, 124), and wherein said main valve seat comprises an annular groove to form first and second annular valve seat portions (125, 126), said first annular portion of said main valve member being arranged to interact with said first annular seat portion to form said up-stream restrictor, said second annular portion of said main valve member being arranged to interact with said second annular seat portion to form said down-stream restrictor.

20. The valve arrangement according to claim 1, further comprising a biasing spring arrangement (14; 214; 414) arranged to resiliently load said control valve member (5; 205; 405) in an opposite direction to said actuating force.

21. The valve arrangement according to claim 20, further comprising a failsafe spring arrangement (14; 214; 414) arranged to resiliently load said control valve member (5; 205; 405) relative said main valve member (4; 204; 404) in an opposite direction to said actuating force, and wherein said failsafe spring arrangement comprises a failsafe spring member (442) and an axially movable spring base member (443), where said failsafe spring member and said biasing spring member (414) are arranged in series with the spring base member there between to resiliently load said control valve member (405) relative said main valve member (404) in an opposite direction to said actuating force.

\* \* \* \* \*